United States Patent [19]

Jacobs

[11] Patent Number: 4,759,470

[45] Date of Patent: Jul. 26, 1988

[54] AUTOMOBILE WINDSHIELD WASHING SERVICE UNIT

[75] Inventor: Thomas E. Jacobs, Brown Deer, Wis.

[73] Assignee: DCI Marketing, Inc., Milwaukee, Wis.

[21] Appl. No.: 924,137

[22] Filed: Oct. 27, 1986

Related U.S. Application Data

[63] Continuation of Ser. No. 693,000, Jan. 22, 1985, abandoned.

[51] Int. Cl.$^4$ .......................... A47L 1/06; A47B 96/00
[52] U.S. Cl. ......................................... 221/97; 221/34; 221/46; 221/199
[58] Field of Search ...................... 221/33, 34, 45, 46, 221/96, 97, 98, 197, 198, 199, 287; 312/37, 228, 247; 240/27.1; 220/20

[56] References Cited

U.S. PATENT DOCUMENTS

| 1,681,840 | 8/1928 | Carlson | 221/34 |
|---|---|---|---|
| 1,697,654 | 1/1929 | Jantzen . | |
| 1,748,789 | 2/1930 | Orkin . | |
| 1,926,436 | 9/1933 | Eldean | 221/198 |
| 2,663,889 | 12/1953 | Fuglie . | |
| 2,884,162 | 4/1959 | Crebbs | 221/46 |
| 3,142,415 | 7/1964 | Louchheim | 221/96 |
| 3,299,458 | 1/1967 | Royalty . | |
| 3,432,217 | 3/1969 | Cowan | 312/242 |
| 4,143,792 | 3/1979 | Rex . | |

FOREIGN PATENT DOCUMENTS

| 1159024 | 6/1958 | France | 221/45 |
|---|---|---|---|
| 497293 | 12/1938 | United Kingdom | 221/46 |

Primary Examiner—Joseph J. Rolla
Assistant Examiner—Edward S. Ammeen
Attorney, Agent, or Firm—Michael, Best & Friedrich

[57] ABSTRACT

A device for use in washing automobile windshields, the device comprising a receptacle including a front wall having first and second openings therein, a first bin for holding and dispensing towels, and second bin for holding water and a windshield washing device. The first bin has an upper end and includes a front panel having a lower end having an opening therein, a back panel spaced apart from the front panel and having a portion opposite the opening slanting toward the lower end of the front panel, and a towel dispenser above the opening for supporting towels in the upper end and for dispensing towels through the opening. The first bin is removably received in the first opening in the front wall of the receptacle such that the opening communicates with the exterior of the receptacle. The second bin has a shape substantially identical to the shape of the first bin and is oriented upside down relative to the first bin, and the second bin is removably received in the second opening in the front wall of the receptacle such that the opening in the second bin communicates with the exterior of the receptacle.

16 Claims, 1 Drawing Sheet

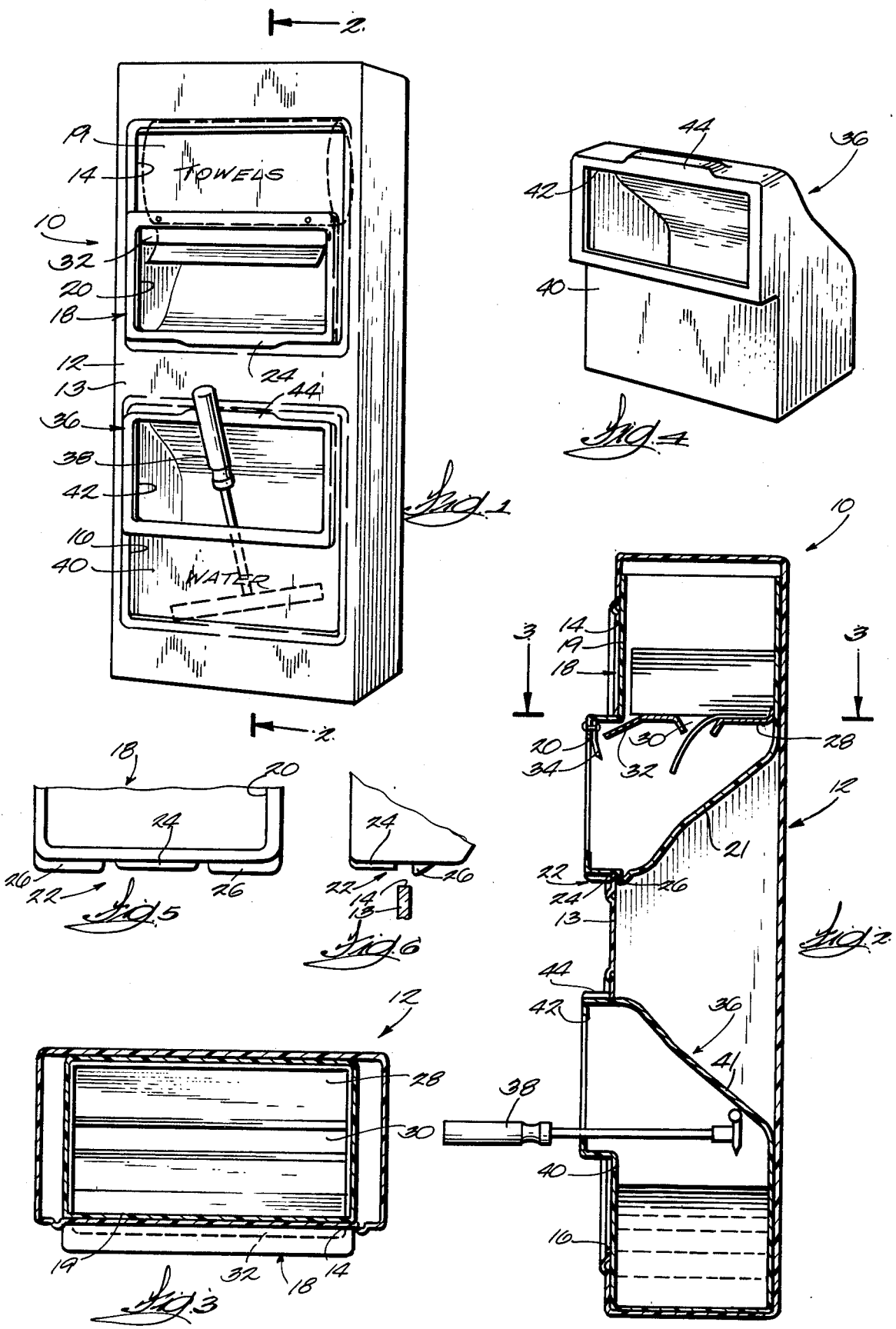

4,759,470

AUTOMOBILE WINDSHIELD WASHING SERVICE UNIT

This is a continuation of co-pending application Ser. No. 693,000, filed on Jan. 22, 1985, now abandoned.

BACKGROUND OF THE INVENTION

The invention relates to apparatus for use in washing automobile windshields, and more particularly to apparatus used in and around the service islands of gas stations. These apparatus commonly include a towel dispenser and a compartment for holding a washing solvent and a squeegee.

Attention is directed to Rex U.S. Pat. No. 4,143,792, issued Mar. 13, 1979, which discloses an automobile windshield washing service unit.

Attention is also directed to Jantzen U.S. Pat. No. 1,697,654, issued Jan. 1, 1929, which discloses a towel stand.

Attention is also directed to the following U.S. Patents which disclose cleaning devices:
Orkin U.S. Pat. No. 1,748,789, issued Feb. 25, 1930;
Royalty U.S. Pat. No. 3,299,458, issued Jan. 24, 1967;
Fuglie U.S. Pat. No. 2,663,889, issued Dec. 29, 1953.

SUMMARY OF THE INVENTION

The invention provides a device for use in washing automobile windshields, the device comprising a generally enclosed receptacle having top and bottom walls, front and back walls, and opposite side walls. The front wall has an opening therein, and the device also comprises a bin received in the opening and housed in the receptacle. The bin has front and back panels, opposite side panels, an open upper end, and a closed lower end. The front panel of the bin has an opening in the lower end thereof, and the bin also includes means above the opening for dispensing towels through the opening. The bin is adapted to hold towels in its upper end to be dispensed by the dispensing means. In the preferred embodiment, the dispensing means is capable of dispensing either individual towel sheets or towels from a roll.

The bin is housed in the receptacle such that the opening in the bin communicates with the exterior of the receptacle and the top wall of the receptacle covers the open upper end of the bin. The bin is removable so that towels can be placed in the upper end of the bin. Preferably, to facilitate removal of the bin from the receptacle, the portion of the back panel opposite the opening in the front panel slants toward the lower end of the front panel and is curved concavely relative to the front panel.

The receptacle preferably also includes a second or lower opening in the front wall, and a second or lower bin removably received in the lower opening and housed in the receptacle. The lower bin holds water or washing solvent and a windshield washing device, such as a squeegee. The lower bin is oriented upside down relative to the upper bin and has a shape substantially identical to the shape of the upper bin, except that the lower bin has a bottom. If desired, the bins can have identical shapes, making the bins more economical to produce.

The front panel of the lower bin has an opening in the upper end thereof, and the lower end of the bin holds the washing solvent. The lower bin is housed in the receptacle such that the opening in the lower bin communicates with the exterior of the receptacle and the bottom wall of the receptacle supports the lower end of the lower bin.

Preferably, the portion of the back panel of the lower bin opposite the opening in the front panel slants toward the upper end of the front panel and is curved concavely relative to the front panel. This facilitates removal of the lower bin from the receptacle, and also provides a surface against which the sponge portion of the squeegee may be compressed to wring out excess washing solvent while the squeegee is laid on the lower edge of the opening in the lower bin.

The receptacle and bins are preferably made of plastic, and, as suggested previously, both bins can be made from the same mold. Therefore, the device can be manufactured very economically.

Other features and advantages of the invention will become apparent to those skilled in the art upon review of the following detailed description, claims, and drawings.

DESCRIPTION OF THE DRAWINGS

FIG. 1 is a perspective view of a windshield washing service unit embodying the invention.

FIG. 2 is a cross-sectional view of the unit taken along line 2—2 in FIG. 1.

FIG. 3 is a cross-sectional view taken along line 3—3 in FIG. 2.

FIG. 4 is a perspective view of the second or lower bin.

FIG. 5 is a partial front view of the lower end of the first or upper bin.

FIG. 6 is a side view of the means on the lower end of the first or upper bin for engaging the lower edge of the first or upper opening.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An automobile windshield washing service unit 10 embodying the invention is illustrated in the drawings. As best shown in FIGS. 1 and 2, the unit 10 includes a generally enclosed receptacle 12 having top and bottom walls, a front wall 13, a back wall, and opposite side walls. The receptacle 12 can be mounted on any suitable supporting means. The only openings in the receptacle 12 are first and second or upper and lower generally square openings 14 and 16, respectively, in the front wall 13 thereof.

The unit 10 also includes a first or upper bin 18 removably received in the upper opening 14 of the receptacle 12 and housed in the receptacle 12. The upper bin 18 has a front panel 19 having an opening 20 in the lower end thereof, a back panel 21 (see FIG. 2), opposite side panels, an open upper end, and a closed lower end. In the preferred embodiment, the lower end of the front panel 19 includes a protruding portion (best shown in FIG. 2) having the opening 20 therein. The bin 18 is housed in the receptacle 12 such that the opening 20 in the bin 18 communicates with the exterior of the receptacle 12, or such that the opening 20 in the bin 18 is within the opening 14 in the receptacle 12. The top wall of the receptacle 12 covers the upper end of the bin 18. As best shown in FIG. 2, in the preferred embodiment, the bin 18 is housed in the receptacle 12 such that the opening 20 in the bin 18 is aligned with the lower half of the opening 14 in the receptacle 12, with the protruding portion of the bin 18 extending outwardly of the front wall 13 of the receptacle 12. The front panel 19 of the bin 18 closes the upper half of the opening 20 in the receptacle 12. Preferably, the word "towels" is printed on the front panel 19 of the bin 18 above the opening 20 so as to be visible through the opening 14 in the receptacle 12.

In the illustrated construction, the lower portion of the back panel 21 of the bin 18 opposite the opening 20 slants toward the lower end of the front panel 19 and is curved toward the front panel 19. The upper portion of the back panel 21 is generally planar and parallel to the front panel 19. This is best shown in FIG. 2.

The bin 18 preferably includes means for retaining the bin 18 in the receptacle 12, and this means preferably includes projection means 22 (see FIGS. 2, 5 and 6) on the lower end of the bin 18 for engaging the lower edge of the opening 14 in the front wall 13 of the receptacle 12. As best shown in FIGS. 5 and 6, the projection means 22 includes a central projection 24 adapted to engage the outer surface of the front wall 13 of the receptacle 12, and a pair of outer projections 26 adapted to engage the inner surface of the front wall 13 of the receptacle 12.

The bin 18 also includes means inside the bin 18 and above the opening 20 for dispensing towels, and the bin 18 is adapted to hold towels in its upper end to be dispensed by the dispensing means through the opening 20. Preferably, the dispensing means is capable of dispensing either individual towel sheets or towels from a roll. As best shown in FIGS. 2 and 3, the dispensing means comprises a plate member 28 generally horizontally mounted in the bin 18 above the opening 20 and including an elongated central opening 30 extending the width of the bin 18 for dispensing towel sheets, and a forward angled portion 32 extending forwardly and downwardly toward the opening 20 and cooperating with the front panel 19 of the bin 18 to define an elongated opening for dispensing a roll of towels. The dispensing means also includes a member 34 (see FIG. 2) secured to the front panel 19 of the bin 18 above the opening 20 and having a sharp lower edge for use in tearing towels off the roll. Towels can be placed in the open upper end of the bin 18 when the bin 18 is removed from the receptacle 12.

The bin 18 is inserted into the receptacle 12 by inserting the upper end of the bin 18 through the opening 14 in the receptacle 12 so that the upper end of the bin 18 is adjacent the top wall of the receptacle 12, and so that the projection means 22 on the lower end of the bin 18 is above the lower edge of the opening 14. The bin 18 is then lowered so that the projection means 22 engages the lower edge of the opening 14. The back panel 21 of the bin 18 abuts the back wall of the receptacle 12 when the bin 18 is received in the receptacle 12, as shown in FIG. 2.

The bin 18 is removed from the receptacle 12 by raising the bin 18 until the projection means 22 clears the lower edge of the opening 14, and then by removing the bin 18 from the opening 14 lower end first.

The slanted and curved portion of the back panel 21 facilitates insertion and removal of the bin 18, as can be appreciated by viewing FIG. 2.

The unit 10 also includes a second or lower bin 36 removably received in the lower opening 16 of the receptacle 12 and housed in the receptacle 12. The lower bin 36 is adapted to hold washing solvent and a windshield washing device such as a squeegee 38. The lower bin 36 is oriented upside down relative to the upper bin 18 and has a shape and construction similar to the shape and construction of the upper bin 18. The lower bin 36 has a front panel 40, a back panel 41 (see FIG. 2), opposite side panels, an open upper end, and a closed lower end. The upper end of the front panel 40 includes a protruding portion having an opening 42 therein. The bin 36 is housed in the receptacle 12 such that the opening 42 in the bin 36 communicates with the exterior of the receptacle 12, or such that the opening 42 in the bin 36 is within the opening 16 in the receptacle. The bottom wall of the receptacle 12 supports the bin 36. As best shown in FIG. 2, in the preferred embodiment, the bin 36 is housed in the receptacle 12 such that the opening 42 is aligned with the upper half of the opening 16 in the receptacle 12, with the protruding portion of the bin 36 extending outwardly of the front wall 13 of the receptacle 12. The front panel 40 of the bin 36 closes the lower half of the opening 16 in the receptacle 12. Preferably, the word "water" is printed on the front panel 40 of the bin 36 below the opening 42 so as to be visible through the opening 16 in the receptacle 12.

The bin 36 preferably includes a projection 44 on its upper end for engaging the outer surface of the front wall 13 of the receptacle 12 above the opening 16. This projection 44 is best shown in FIGS. 2 and 4 and is substantially identical to the central projection 24 on the lower end of the upper bin 18.

The bin 36 is inserted into the receptacle 12 by inserting the lower end of the bin 36 through the opening 16 in the receptacle 12 so that the lower end of the bin 36 is supported by the bottom wall of the receptacle 12, and so that the projection 44 on the upper end of the bin 36 engages the outer surface of the front wall 13 of the receptacle 12.

The bin 36 is removed from the receptacle 12 upper end first.

The slanted and curved portion of the back panel 41 of the lower bin 36 facilitates insertion and removal of the bin 36, as with the upper bin 18, and also provides a surface against which the sponge portion of the squeegee 38 can be compressed to wring out excess washing solvent while the squeegee 38 is laid on the lower edge of the opening 42, as shown in FIG. 2.

Various features and advantages of the invention are set forth in the following claims.

I claim:

1. A device for use in washing automobile windshields, said device comprising
a receptacle including a front wall having first and second openings therein,
a first bin for holding and dispensing towels, said first bin having an upper end and including a front panel having a lower end having a third opening therein, a back panel spaced apart from said front panel and having a slanting portion located opposite said third opening and slanting downwardly and forwardly toward said lower end of said front panel, and means located above said third opening and within said first bin for supporting towels in said upper end and for dispensing towels through said third opening, said first bin being housed in said receptacle such that said third opening is within said first opening, and said first bin being removable from said receptacle solely through said first opening, said slanting portion both facilitating removal of said first bin through said first opening and directing towels through said third opening, and a second bin for holding water and a windshield washing device, said second bin having a size and shape substantially identical to the size and shape of said first bin and being oriented upside down relative to said first bin, said second bin having a lower end and including a front panel having an upper end having a fourth opening therein, a back panel spaced apart from said front panel of said second bin and having a slanting portion located opposite said fourth opening and slanting upwardly and forwardly toward said front panel of said second bin, and a bottom panel closing said lower end of said second bin to form a fluid reservoir beneath said fourth opening, said second bin being housed in said receptacle such that said fourth opening is within said second opening, and said second bin being removable from said receptacle solely through said second opening, said slanting portion of said second bin both facilitating removal of said second bin through said second opening and providing a surface against which fluid can be wrung from a windshield washing device.

2. A device as set forth in claim 1 wherein said first opening in said front wall of said receptacle is positioned above said second opening in said front wall of said receptacle.

3. A device as set forth in claim 1 wherein said upper end of said first bin is open and is adapted to receive towels to be dispensed by said dispensing means.

4. A device as set forth in claim 3 wherein said receptacle has a top wall covering said open upper end of said first bin.

5. A device as set forth in claim 1 wherein said receptacle has a lower end and includes a bottom wall closing said lower end and supporting said second bin.

6. A device as set forth in claim 1 wherein said front wall of said receptacle has an outer surface, and wherein said second bin has an upper end and a projection on said upper end engaging said outer surface above said second opening in said front wall.

7. A device as set forth in claim 1 wherein said slanting portion of said back panel of said first bin is curved concavely relative to said front panel of said first bin, and wherein said slanting portion of said back panel of said second bin is curved concavely relative to said front panel of said second bin.

8. A device as set forth in claim 7 wherein said front panels of said first and second bins are generally planar and are substantially aligned with said front wall of said receptacle, wherein said back panel of said second bin has a lower portion that is substantially planar and parallel to said front panel of said second bin, and wherein said back panel of said first bin has an upper portion that is substantially planar and parallel to said front panel of said first bin.

9. A device as set forth in claim 1 wherein said first bin includes indicia on said front panel intermediate said opening and said upper end, and wherein said second bin includes indicia on said front panel intermediate said opening and said lower end.

10. A device for use in washing automobile windshields, said device comprising a receptacle including a top wall, a bottom wall, and a generally vertical front wall having therein a first opening and a second opening beneath said first opening, said first opening having a height and being fixedly bounded on all sides by said front wall, and said second opening having a height and being fixedly bounded on all sides by said front wall, a first bin having a height greater than the height of said first opening and including an open upper end defining a generally horizontal plane, a front panel generally parallel to said front wall and having a lower end having therein a third opening defining a generally vertical plane, a back panel spaced apart from said front panel and having a slanting portion located opposite said third opening and slanting downwardly and forwardly toward said lower end of said front panel, and a plate member located above said third opening and within said first bin for supporting towels in said upper end and including a towel dispensing opening for dispensing towels through said third opening, said first bin being insertable into said receptacle with said upper end of said first bin being slidably insertable into said receptacle through said first opening and said bin being rotatable in said receptacle such that said upper end of said first bin moves upwardly and extends above said first opening and within said receptacle with said front panel closing said first opening, such that said third opening is within said first opening and communicates with the exterior of said receptacle, and such that said top wall of said receptacle covers said open upper end of said first bin, and said slanting portion facilitating removal of said first bin from said receptacle solely through said first opening so that towels can be placed in said open upper end of said first bin, and a second bin for holding water and a windshield washing device, said second bin having a height greater than the height of said second opening and including a lower end defining a generally horizontal plane, a front panel generally parallel to said front wall and having a lower end, and an upper end having therein a fourth opening defining a generally vertical plane, a back panel spaced apart from said front panel of said second bin and having a slanting portion located opposite said fourth opening and slanting upwardly and forwardly toward said upper end of said front panel of said second bin, and a bottom panel closing said lower end of said second bin to define a reservoir beneath said fourth opening, said second bin having a size and shape substantially the same as the size and shape of said first bin and being oriented upside down relative to said first bin, and said second bin being insertable into said receptacle with said lower end of said second bin being insertable into said receptacle through said second opening and said second bin being rotatable in said receptacle such that said lower end of said second bin moves downwardly and extends below said second opening and within said receptacle with said front panel of said second bin closing said second opening, such that said fourth opening is within said second opening and communicates with the exterior of said receptacle, and such that said bottom wall of said receptacle supports said second bin, and said slanting portion of said second bin facilitating removal of said second bin from said receptacle solely through said second opening.

11. A device as set forth in claim 10 wherein said front wall of said receptacle has an outer surface, and wherein said second bin has an upper end and a projection on said upper end engaging said outer surface above said second opening in said front wall.

12. A device as set forth in claim 10 wherein said slanting portion of said back panel of said first bin is curved concavely relative to said front panel of said first bin, and wherein said slanting portion of said back panel of said second bin is curved concavely relative to said front panel of said second bin.

13. A device as set forth in claim 12 wherein said front panels of said first and second bins are generally planar and are substantially aligned with said front wall of said receptacle, wherein said back panel of said first bin has an upper portion that is substantially planar and parallel to said front panel of said first bin, and wherein said back panel of said second bin has a lower portion that is substantially planar and parallel to said front panel of said second bin.

14. A device as set forth in claim 10 wherein said first bin includes indicia on said front panel intermediate said opening and said upper end, and wherein said second bin includes indicia on said front panel intermediate said opening and said lower end.

15. A device for use in washing automobile windshields, said device comprising a receptacle including a front wall having first and second openings therein, said front wall of said receptacle including inner and outer surfaces and a generally horizontal edge defining the lower boundary of said first opening, a first bin for holding and dispensing towels, said first bin having an upper end and a lower end and including a front panel having a lower end having a third opening therein, a back panel spaced apart from said front panel and having a portion located opposite said third opening and slanting toward said lower end of said front panel, and means located above said third opening and within said first bin for supporting towels in said upper end and for dispensing towels through said third opening, said first bin being housed in said receptacle such that said third opening is within said first opening, and said first bin being removable from said receptacle through said first opening, said first bin including a protruding portion having therein said third opening and extending outwardly of said front wall through said first opening, a second bin for holding water and a windshield washing device, said second bin having a shape substantially identical to the shape of said first bin and being oriented upside down relative to said first bin, said second bin having a lower end and including a front panel having an upper end having a fourth opening therein, a back panel spaced apart from said front panel of said second bin and having a portion opposite said fourth opening and slanting toward said front panel of said second bin, and a bottom panel closing said lower end of said second bin, said second bin being housed in said receptacle such that said fourth opening is within said second opening, and said second bin being removable from said receptacle through said second opening, and means for retaining said first bin in said first opening, said retaining means including said horizontal edge and projection means on said lower end of said first bin for engaging said edge, said projection means including, on said protruding portion of said first bin, a central projection engaging one of said inner and outer surfaces of said front wall adjacent said edge, and a pair of outer projections engaging the other of said inner and outer surfaces adjacent said edge.

16. A device for use in washing automobile windshields, said device comprising a receptacle including a top wall, a bottom wall, and a front wall having therein a first opening and a second opening beneath said first opening, said front wall of said receptacle including inner and outer surfaces and a generally horizontal edge defining the lower boundary of said first opening, a first bin including a lower end and an open upper end, a generally planar front panel generally parallel to said front wall and having a lower end having a third opening therein, a back panel spaced apart from said front panel and having a portion located opposite said third opening and slanting toward said lower end of said front panel, and a plate member located above said third opening and within said first bin for supporting towels in said upper end and including a towel dispensing opening for dispensing towels through said third opening, said first bin being housed in said receptacle such that said upper end of said first bin extends above said first opening and within said receptacle with said front panel partially closing said first opening, such that said third opening is within said first opening and communicates with the exterior of said receptacle, and such that said top wall of said receptacle covers said open upper end of said first bin, and said first bin being removable from said receptacle through said first opening so that towels can be placed in said open upper end of said first bin, said first bin including a protruding portion having therein said third opening and extending outwardly of said front wall through said first opening, a second bin for holding water and a windshield washing device, said second bin including a lower end, a generally planar front panel generally parallel to said front wall and having a lower end, and an upper end having a fourth opening therein, a back panel spaced apart from said front panel of said second bin and having a portion located opposite said fourth opening and slanting toward said upper end of said front panel of said second bin, and a bottom panel closing said lower end of said second bin, said second bin having a shape substantially the same as the shape of said first bin and being oriented upside down relative to said first bin, and said second bin being housed in said receptacle such that said lower end of said second bin extends below said second opening and within said receptacle with said front panel of said second bin closing said second opening, such that said fourth opening is within said second opening and communicates with the exterior of said receptacle, and such that said bottom wall of said receptacle supports said second bin, and said second bin being removable from said receptacle through said second opening, and means for retaining said first bin in said first opening, said retaining means including said horizontal edge and projection means on said lower end of said first bin for engaging said edge said projection means including, on said protruding portion of said first bin, a central projection engaging one of said inner and outer surfaces of said front wall adjacent said edge, and a pair of outer projections engaging the other of said inner and outer surfaces adjacent said edge.

* * * * *